United States Patent Office 3,652,641
Patented Mar. 28, 1972

3,652,641
HYDROCYANATION OF OLEFINS
Joe Douglas Druliner, Newark, Del., assignor to E. I. du Pont de Nemours and Company, Wilmington, Del.
No Drawing. Filed Aug. 4, 1969, Ser. No. 847,400
Int. Cl. C07c *121/04*
U.S. Cl. 260—465.8
10 Claims

ABSTRACT OF THE DISCLOSURE

A process for the hydrocyanation of non-conjugated ethylenically unsaturated organic compounds using certain nickel complexes, such as a tetrakis (triaryl phosphite) nickel (0), as catalyst and a boron compound selected from the class consisting of $B(OR')_3$ where $R'$ is an alkyl or aryl group of up to 7 carbon atoms, and $nB(OH)_3 \cdot xH_2O$ where $n$ is 1 or 2 and $x$ is from 0 to 3.

CROSS REFERENCES TO RELATED APPLICATIONS

Copending application Ser. No. 509,432, filed Nov. 23, 1965, by William C. Drinkard, Jr., and Richard V. Lindsey, Jr., now U.S. Pat. 3,496,215, related to a process for the hydrocyanation of olefins which involves the use as catalyst of selected nickel compounds.

BACKGROUND OF THE INVENTION

It is known that the addition of hydrogen cyanide to carbon-carbon double bonds adjacent to an activating group such as a nitrile or a carboxy group proceeds with relative ease. However, the addition of hydrogen cyanide to nonactivated carbon-carbon double bonds proceeds only with difficulty, if at all, and normally requires the use of high pressure of about 1,000 p.s.i. or more and high temperatures in the range of 200 to 400° C. U.S. Pat. No. 2,571,099, issued on Oct. 16, 1951, to Paul Arthur, Jr., and Burt Carlton Pratt, discloses an improvement over this technique, which improvement involves the use of nickel carbonyl with or without the addition of a tertiary aryl phosphine or arsine. This process suffers from producing a relatively high percentage of undesirable polymeric products when applied to nonconjugated olefinic starting materials and a relatively poor yield in all cases. Furthermore, this process is not satisfactory for the production of adiponitrile from pentenenitriles.

SUMMARY OF THE INVENTION

The present invention is an improvement over the abovementioned processes and involves the use of certain boron compounds as promoters for the reaction.

The present invention provides a hydrocyanation process which produces nitriles or dinitriles from nonconjugated olefins in high yield under mild conditions, with minimal formation of polymer and minimal use of catalyst.

The process of the present invention is generally applicable to ethylenically unsaturated organic compounds containing from 2 to 20 carbon atoms having at least one nonconjugated aliphatic carbon-carbon double bond. The 3-pentenenitriles and 4-pentenenitrile are especially preferred. In the hydrocyanation of 3-pentenenitrile to adiponitrile, the 3-pentenenitrile is first isomerized to 4-pentenenitrile which is then hydrocyanated to form adiponitrile. Other suitable ethylenically unsaturated compounds include olefins and olefins substituted with groups which do not attack the catalyst, such as cyano. These unsaturated compounds include monoolefins containing from 2 to 20 carbons, such as ethylene, propylene, butene-1, pentene-2, hexene-2, etc.; diolefins, such as allene; and substituted compounds such as 3-pentenenitriles and 4-pentenenitrile.

The present process offers its greatest advantage over previous processes in improved catalyst life in the production of dinitriles such as adiponitrile from either 3-pentenenitriles or 4-pentenenitrile. The total number of cycles (mole ratio of product to catalyst) obtained often depends on the impurities in the system but there is a uniform improvement obtained through the use of a promoter. Improved yields and reaction rates are generally also obtained through the use of promoter.

The catalysts are generally nickel compounds most of which are preferably free of carbon monoxide which may be preformed or prepared in situ and include nickel compounds containing ligands such as alkyl or aryl (either of which contain up to 25 carbon atoms) phosphines, arsines, stibines, phosphites, arsenites, stibites, and mixtures thereof.

An especially preferred group of these nickel compounds have the general structure

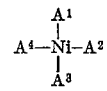

where $A^1$, $A^2$, $A^3$, and $A^4$ are neutral ligands which may be the same or different. The ligands useful in forming the catalyst here may be defined as any atoms or molecules capable of functioning as a sigma-pi bonded partner in one or more coordinate bonds. Generally, the neutral ligands such as $P(OR)_3$ are preferred where R has the meaning defined below. A description of such ligands may be found in "Advanced Inorganic Chemistry" by F. Albert Cotton and G. Wilkinson, published by Interscience Publishers, a division of John Wiley & Sons, 1962, Library of Congress Catalog Card No. 62–41818; particularly on pages 602–606. Preferably, $A^1$, $A^2$, $A^3$, and $A^4$ have the structure M(XYZ) wherein M is selected from the class consisting of P, As, and Sb, and wherein X, Y, and Z may be the same or different and are selected from the class consisting of R and OR and wherein R is selected from the class consisting of alkyl and aryl groups having up to 25 carbon atoms. If desired, any of X, Y, and Z may be cojoined where possible. An especially preferred class of R's are

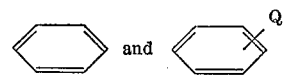

wherein Q is selected from the class consisting of Cl, $OCH_3$, and alkyl of from 1 to 19 carbon atoms. If desired, any of the R's may be cojoined where possible. Thus, the preferred neutral ligands of this group are the aryl phosphites such as triphenyl phosphite, tris (meta and para-chlorophenyl) phosphite, tris(meta- and para-methoxyphenyl) phosphite and tris(meta- and para-cresyl) phosphite and mixtures thereof. It is believed that in these nickel complexes at least some of the nickel is present in the zero valent state.

Satisfactory techniques for preparing these nickel compounds may be found in French Pat. 1,297,934 granted May 28, 1962, to Messrs. Reginald Francis Clark and Charles Dean Storrs and which French patent is stated to be equivalent to U.S. Pat. No. 3,328,443 issued June 27, 1967. Other techniques for preparing these catalysts are described in J. Chatt and F. A. Hart, Chem. Soc. Journal (London), pages 1378–1389 (1960) and by Lewis S. Meriweather and Marilyn L. Fiene, J. Am. Chem. Soc., 81, 4200–4209 (1959).

In many instances, it is advantageous to have an excess of certain neutral ligands present with respect to the nickel complex. The preferred excess ligands are the aryl phosphites wherein the aryl groups contain up to 25 carbon atoms and particularly phenyl and substituted phenyl groups containing up to 25 carbon atoms such as phenyl, biphenyl, meta- and para-methoxyphenyl, meta- and para-chlorophenyl, meta- and para-cresyl, or meta- and para-pentadecyl. Generally, the excess ligand is present in at least a two mole excess as based on the nickel present. As used herein a two mole excess of ligand means two moles of ligand above and beyond that necessary to satisfy the valences of the nickel present. Thus, for example, when the nickel catalyst used is $Ni[P(OC_6H_5)_3]_4$ a total of 6 moles (4 attached to the nickel catalyst used, plus 2 moles of "excess") are actually present in the reaction mixture. The only limit of excess ligand involves practical considerations for it may even be used as the solvent. However, generally, there is little advantage to be obtained in using over a 300 mole excess of ligand as based on one mole of nickel. The preferred triaryl phosphites for use as excess ligand are triphenyl phosphite, tri (meta- and para-methoxyphenyl) phosphite and tri (meta- and para-cresyl) phosphite, and mixtures thereof.

This use of excess ligand generally may be used to control the product distribution and, hence, reduce the amount of by-products formed as well as to extend catalyst life. The excess ligand used may be the same or different from the ligand attached to nickel in the nickel compound as fed to the reactor.

There are several techniques for in situ preparation of the nickel compounds. For example, nickel carbonyl and a neutral ligand as defined above other than carbon monoxide can be added to the reaction mixture. It is preferred to wait until carbon monoxide evolution ceases before using the catalyst. Generally, all four moles of CO are replaced by another ligand such as triphenyl phosphite. A second technique involves adding the neutral ligand (as defined above), a nickel (II) compound such as a nickel halide, e.g. $NiCl_2$, or bis (acetylacetonato) nickel (II) and a source of hydride ions. Suitable sources of $H^-$ ions are compounds of the structure $M'|BH_4|_x$, $H_2$, and $M'H_x$ where $M'$ is an alkali metal or an alkaline earth metal and X is a number corresponding to the valence of the metal. A third technique is to add dicyclopentadienyl nickel to a neutral ligand such as $P(OR)_3$ where R is an aryl radical, to the reaction mixture. In each case, the catalyst is formed under the hydrocyanation reaction conditions hereinafter described and no other special temperatures or pressures need be observed.

The improvement to which this invention is directed involves the used of a promoter to activate the catalyst. The promoter generally is selected from the class consisting of boron compounds of the $B(OR')_3$ where R' is an alkyl or aryl group of up to 7 carbon atoms, and $nB(OH)_3$—$xH_2O$ where n is an integer and x is a number of from 0 to 3.

The compounds of the general formula $$nB(OH)_2-xH_2O$$

represent a series of anhydride forms or ortho boric acid, $B(OH)_3$, as defined by P. C. L. Thorne and E. R. Roberts, Compounds of Boron and Oxygen, page 851, "Inorganic Chemistry," Interscience Publishers, Inc., New York, (1949), 5th ed.

The promoter acts to improve the number of cycles and, in certain cases, the yield and rate. This is particularly evident in the hydrocyanation of 3- or 4-pentenenitrile to adiponitrile. The amount of promoter used generally can be varied from about 1:16 to 50:1 molar ratio of promoter to catalyst. The promoter may be used according to several techniques. Thus, while at least some of the promoter may be added to the reaction mixture at the start of the reaction, additional amounts may be added at any point in time during the reaction.

The hydrocyanation reaction is preferably carried out by charging the reactor with the catalyst, or catalyst components, the ethylenically unsaturated organic compound, the promoter and whatever solvent is to be used, if any, followed by sweeping the hydrogen cyanide over the surface of the reaction mixture or bubbling it through said reaction mixture. Another technique is to charge the reactor with the catalyst, promoter, and whatever solvent is to be used and then to feed the unsaturated compound and hydrogen cyanide slowly to the reaction mixture. The molar ratio of unsaturated compound to catalyst generally is varied from about 10:1 to 2000:1. In a continuous operation a much higher proportion of catalyst such as 1:5 of ethylenically unsaturated organic compound to catalyst may be fed to the reactor.

Preferably, the reaction medium is agitated, such as by stirring or shaking. The hydrocyanation product can be recovered by conventional techniques such as by distillation. The reaction may be run either semibatchwise or in a continuous manner.

The hydrocyanation reaction can be carried out with or without a solvent. The solvent should be liquid at the reaction temperature and pressure and inert towards the unsaturated compound and the catalyst. Generally, such solvents are hydrocarbons such as benzene or xylene, or nitriles such as acetonitrile or benzonitrile. In many cases, the excess phosphite or other excess ligand may serve as the solvent.

Certain ethers can be added to the reaction mixture, many of which ethers are solvents. These ethers act to produce an improved yield and generally higher cycles, particularly in the production of adiponitrile from 3-pentenenitrile or 4-pentenenitrile. This influence is generally greatest at temperatures of from about 20 to 75° C. Up to 75 volume per cent of ether is used as based on the total reaction mixture. These ethers may be cyclic or acyclic and may contain from 1 to 5 ether linkages between lower alkylene radicals or arylene radicals and in the case of acyclic ethers are end capped with lower alkyl groups. These ethers include dioxane, trioxane,

o-dimethoxybenzene, tetrahydrofuran, etc.

The exact temperature which is preferred is dependent to a certain extent on the particular catalyst being used, the particular ethylenically unsaturated compound being used and the desired rate. Generally, temperatures of from −25 to 200° C. can be used with from 0 to 150° C. being preferred.

Atmospheric pressure is satisfactory for carrying out the present invention and, hence, pressures of from about 0.05 to 10 atmospheres are preferred due to the obvious economic considerations although pressures of from 0.05 to 100 atmospheres can be used if desired.

The nitriles formed by the present invention are useful as chemical intermediates. For instance, adiponitrile is an intermediate used in the production of hexamethylene diamine which in turn is used in the production of polyhexamethylene adipamide, a commercial polyamide useful in forming fibers, films and molded articles. Other nitriles can be used to form the corresponding acids and amines which are conventional commercial products.

Unless otherwise stated, all percentages reported in the examples are by weight.

DESCRIPTION OF THE PREFERRED EMBODIMENTS

Example I

A 100 ml., three-neck, round bottom flask, fitted with a water cooled reflux condenser connected to a Dry Ice trap, an inlet, and a Teflon® covered magnetic stirrer is set up in an oil bath maintained at 80° C., and purged with nitrogen. The flask is charged with 1.43 g. of

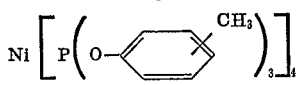

0.21 g. of B(OC₆H₅)₃, 10.5 g. of 3-pentenenitrile and 1.74 g. of mixed meta- and para-tricresyl phosphite. A stream of nitrogen gas is bubbled through liquid hydrogen cyanide contained in a 20 ml. flask cooled in an ice bath. The resulting gas mixture is dried in a gas drying tube containing P₂O₅ and is then swept across the surface of the reaction mixture in the flask at a rate of 1.0 ml./hr. of HCN (measured as a liquid). After 6 hours, the reaction is shut down.

Gas chromatographic analysis indicates that of the dicyanobutanes produced 84.2% is adiponitrile. The number of cycles (mole ratio of dicyanobutanes produced to nickel catalyst charged) is 78.

Example II

A 100 ml., three-neck, round bottom flask fitted with a water cooled reflux condenser connected to a Dry Ice trap, an inlet and a Teflon® covered magnetic stirrer, is set up in an oil bath maintained at 60° C. and purged with nitrogen. The flask is charged with 1.02 g. of

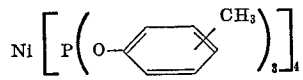

0.77 g. of B(OC₆H₅)₃, 2.35 g. of tricresyl phosphite and 11.66 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask at a rate of 0.3 ml./hr. of HCN (measured as a liquid). After 6 hours the reaction is shut down.

Gas chromatographic analysis indicates that of the dicyanobutanes produced 84.3% is adiponitrile. The number of cycles (mole ratio of dicyanobutanes produced to nickel catalyst charged) is 36.

Example III

A 100 ml., three-neck, round bottom flask, fitted with a water cooled reflux condenser connected to a Dry Ice trap, an inlet and a Teflon® covered magnetic stirrer, is set up in an oil bath maintained at 100° C., and purged with nitrogen. The flask is charged with 1.02 g. of

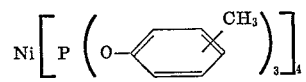

0.22 g. of B(OC₆H₅)₃, 2.03 g. of tricresyl phosphite and 12.12 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask at a rate of 0.4 ml./hr. of HCN (measured as a liquid). After 6 hours the reaction is shut down.

Gas chromatographic analysis indicates that of the dicyanobutanes produced 83.5% is adiponitrile. The number of cycles (mole ratio of dicyanobutanes produced to nickel catalyst charged) is 40.

Example IV

A 100 ml., three-neck, round bottom flask, fitted with a water cooled reflux condenser connected to a Dry Ice trap, an inlet, a thermometer and a Teflon® covered magnetic stirrer, is set up in an oil bath maintained at 80° C., and purged with nitrogen. The flask is charged with 0.308 g. of

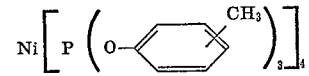

0.09 g. of B₂O₃, 3.96 g. of tricresyl phosphite and 23.37 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask at a rate of 0.4 ml./hr. of HCN (measured as a liquid). After 6 hours the reaction is shut down.

Gas chromatographic analysis indicates that of the dicyanobutanes produced 80.6% is adiponitrile. The number of cycles (mole ratio of dicyanobutanes produced to catalyst charged) is 29.2.

Example V

A 100 ml., three-neck, round bottom flask, fitted with a water cooled reflux condenser connected to a Dry Ice trap, an inlet, a thermometer and a Teflon® coated magnetic stirrer, is set up in an oil bath maintained at 80° C., and purged with nitrogen. The flask is charged with 1.43 g. of

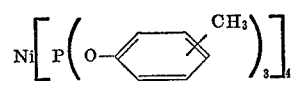

0.15 g. of B₂O₃, 3.75 g. of tricresyl phosphite and 12.08 g. of 3-pentenenitrile. A stream of nitrogen gas is bubbled through liquid hydrogen cyanide in a 20 ml. flask contained in an ice bath. The resulting gas mixture is swept across the surface of the reaction mixture in the flask at a rate of 1.0 ml./hr. of HCN (measured as a liquid). After 6 hours the reaction is shut down.

Gas chromatographic analysis indicates that of the dicyanobutanes produced 84.7% is adiponitrile. The number of cycles (mole ratio of dicyanobutanes produced to catalyst charged) is 20.

Example VI

A 100 ml., three-neck, round bottom flask, fitted with a water cooled reflux condenser connected to a Dry Ice trap, an inlet, a thermometer and a Teflon® covered magnetic stirrer, is set up in an oil bath maintained at 80° C., and purged with nitrogen. The flask is charged with 2.89 g. of

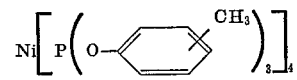

0.20 g. of HOBO, 6.71 g. of tricresyl phosphite and 24.47 g. of 3-pentenenitrile. A stream of nitrogen gas is bubbled through liquid hydrogen cyanide contained in a 20 ml. flask cooled in an ice bath. The resulting gas mixture is swept across the surface of the reaction mixture in the flask at a rate of 1.4 ml./hr. of HCN (measured as a liquid). After 6 hours the reaction is shut down.

Gas chromatographic analysis indicates that of the 3-pentenenitrile converted to dicyanobutanes 84.7% is adiponitrile. The number of cycles (mole ratio of dicyanobutanes produced to catalyst charged) is 12.5.

What is claimed is:

1. In a process of hydrocyanating a nonconjugated ethylenic carbon-carbon double bond in an organic compound selected from the class consisting of olefins and cyano substituted olefins, which organic compound contains from 2 to 20 carbon atoms, by contacting the organic compound with hydrogen cyanide in the presence of a nickel complex of the structure

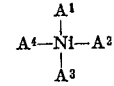

wherein $A^1$, $A^2$, $A^3$, and $A^4$ have the formula P(XYZ) wherein XY and Z are selected from the class consisting of R and OR and R is selected from the class consisting of alkyl and aryl groups having up to 25 carbon atoms; the improvement which comprises carrying out the hydrocyanation in the presence of a boron compound selected from the class consisting of B(OR')₃ where R' is an alkyl or aryl group of up to 7 carbon atoms and

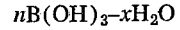

where $n$ is 1 or 2 and $x$ is from 0 to 3, and which boron compound is present in a molar ratio of from about 1:16 to 50:1 boron: nickel, at a temperature of from −25 to 200° C., and recovering an organic cyano compound derived from said organic compound by addition of hydrogen cyanide to the double bond thereof.

2. The process of claim 1 wherein X, Y and Z or OR and R is selected from the group consisting of

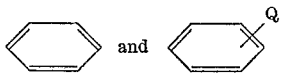

wherein Q is selected from the group consisting of Cl, $OCH_3$, are alkyl of from 1 to 19 carbon atoms.

3. The process of claim 2 wherein Q is $CH_3$.

4. The process of claim 2 wherein the boron compound is $B_2O_3$.

5. The process of claim 2 wherein the boron compound is HOBO.

6. The process of claim 2 wherein the boron compound is $B(OR')_3$.

7. The process of claim 6 wherein R' is phenyl.

8. The process of claim 5 wherein the organic compound is selected from the class consisting of 3-pentenenitrile and 4-pentenenitrile and the principal organic cyano compound recovered is adiponitrile.

9. The process of claim 6 wherein the organic compound is selected from the class consisting of 3-pentenenitrile and 4-pentenenitrile and the principal organic cyano compound recovered is adiponitrile.

10. The process of claim 9 wherein the organic compound is selected from the class consisting of 3-pentenenitrile and 4-pentenenitrile and the principal organic cyano compound recovered is adiponitrile.

References Cited

UNITED STATES PATENTS 3,496,215   2/1970   Drinkard et al. _____ 260—465.8
3,496,218   2/1970   Drinkard, Jr., et al. __ 260—465.8

JOSEPH P. BRUST, Primary Examiner

U.S. Cl. X.R.

260—465.3